(12) United States Patent
Okuma

(10) Patent No.: US 11,496,635 B2
(45) Date of Patent: Nov. 8, 2022

(54) INFORMATION PROCESSING SYSTEM FOR OBTAINING READ DATA OF HANDWRITTEN CHARACTERS, TRAINING A MODEL BASED ON THE CHARACTERS, AND PRODUCING A FONT FOR PRINTING USING THE MODEL

(71) Applicant: CANON KABUSHIKI KAISHA, Tokyo (JP)

(72) Inventor: Keisui Okuma, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/228,463

(22) Filed: Apr. 12, 2021

(65) Prior Publication Data

US 2021/0234975 A1 Jul. 29, 2021

Related U.S. Application Data

(63) Continuation of application No. PCT/JP2019/041914, filed on Oct. 25, 2019.

(30) Foreign Application Priority Data

Nov. 22, 2018 (JP) .............................. JP2018-219453

(51) Int. Cl.
*H04N 1/00* (2006.01)
*G06T 7/13* (2017.01)
(Continued)

(52) U.S. Cl.
CPC ..... *H04N 1/00331* (2013.01); *G06K 15/1802* (2013.01); *G06N 3/08* (2013.01);
(Continued)

(58) Field of Classification Search
CPC .................................................. H04N 1/00331
See application file for complete search history.

(56) References Cited

U.S. PATENT DOCUMENTS

| 6,026,178 A | 2/2000 | Toda .............................. 382/158 |
| 2010/0008581 A1* | 1/2010 | Bressan ............. G06V 30/2264 382/177 |

(Continued)

FOREIGN PATENT DOCUMENTS

| JP | H04-199386 | 7/1992 |
| JP | H05-143726 | 6/1993 |

(Continued)

OTHER PUBLICATIONS

International Search Report and Written Opinion in counterpart International Application No. PCT/JP2019/041914.

(Continued)

*Primary Examiner* — Benjamin O Dulaney
(74) *Attorney, Agent, or Firm* — Venable LLP

(57) ABSTRACT

An information processing system acquires, using a reading device, a read image from an original on which a handwritten character is written; acquires, based on the read image, a partial image that is a partial region of the read image and a binarized image that expresses the partial image by two tones; performs learning of a learning model based on learning data that uses the partial image as a correct answer image and the binarized image as an input image; acquires print data including a font character; generates conversion image data including a gradation character obtained by inputting the font character to the learning model; and causes an image forming device to form an image based on the generated conversion image data.

18 Claims, 13 Drawing Sheets

(51) Int. Cl.
    *G06K 15/02*     (2006.01)
    *G06N 3/08*     (2006.01)
    *G06V 10/44*     (2022.01)
    *G06V 30/28*     (2022.01)

(52) U.S. Cl.
    CPC ............. *G06T 7/13* (2017.01); *G06V 10/44* (2022.01); *H04N 1/00392* (2013.01); *G06V 30/287* (2022.01)

(56) References Cited

U.S. PATENT DOCUMENTS

2020/0320325 A1    10/2020    Okuma ................ G06K 9/2054
2021/0201548 A1*    7/2021    Ozeki ................ G06V 10/7715

FOREIGN PATENT DOCUMENTS

| | | |
|---|---|---|
| JP | H05-183753 | 7/1993 |
| JP | H05-250109 | 9/1993 |
| JP | H09-006309 | 1/1997 |
| JP | H09-81723 | 3/1997 |
| JP | H09-198023 | 7/1997 |
| JP | 2011-022429 | 2/2011 |
| JP | 2014-016871 | 1/2014 |
| JP | 2015-056101 | 3/2015 |

OTHER PUBLICATIONS

Office Action dated Sep. 22, 2022 in counterpart Japanese Application No. 2018-219453, together with English translation thereof.

* cited by examiner

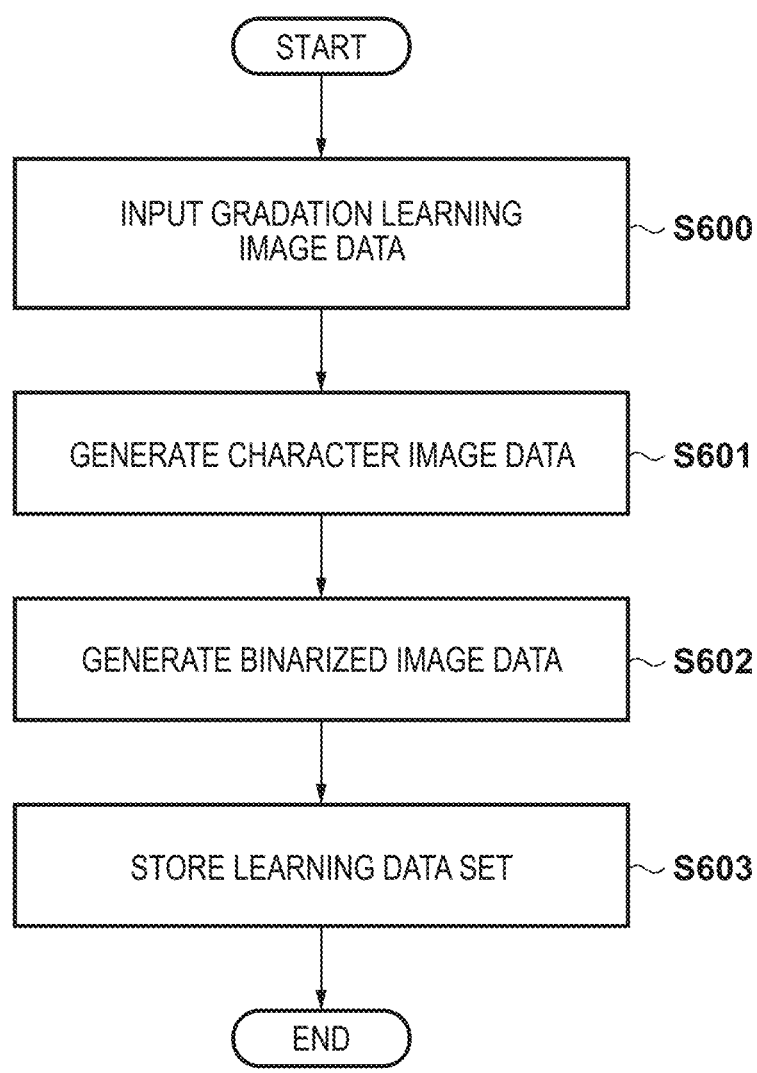

FIG. 8A

| ID | BINARIZED IMAGE DATA | CORRECT ANSWER IMAGE DATA |
|---|---|---|
| 1 | レ | レ |
| 2 | ぱ | ぱ |
| 3 | 一 | 一 |
| ... | | |

FIG. 8B

| ID | BINARIZED IMAGE DATA | CORRECT ANSWER IMAGE DATA |
|---|---|---|
| 1 | レぱ / ro | レぱ / ro |
| 2 | 身忍 | 身忍 |
| 3 | 電に | 電に |
| ... | | |

INFORMATION PROCESSING SYSTEM FOR OBTAINING READ DATA OF HANDWRITTEN CHARACTERS, TRAINING A MODEL BASED ON THE CHARACTERS, AND PRODUCING A FONT FOR PRINTING USING THE MODEL

CROSS-REFERENCE TO RELATED APPLICATIONS

This application is a Continuation of International Patent Application No. PCT/JP2019/041914, filed Oct. 25, 2019, which claims the benefit of Japanese Patent Application No. 2018-219453, filed Nov. 22, 2018, both of which are hereby incorporated by reference herein in their entirety.

BACKGROUND OF THE INVENTION

Field of the Invention

The present invention relates to an information processing system for adding gradation to an image, an information processing apparatus, and an image forming apparatus.

Background Art

In recent years, there has been proposed a method of adding gradation as in a character written using a writing tool such as a fountain pen to an image of an electronically handwritten character input by an electronic pen or the like. Here, the gradation addition corresponds to tone conversion processing of expressing a halftone by compositing a mask image expressed by 256 tones with an image expressed by two monochrome tones. PTL 1 describes a method of adding gradation to a track on a tablet based on the information of a pressure value and a speed when the user has written on the tablet using a finger or a pen. PTL 2 describes a method of writing using a dedicated pen with a piezoelectric sensor in the tip, acquiring a voltage value from each tip, and adding gradation in accordance with the voltage value. PTL 3 describes a method of holding a plurality of gradation patterns in advance, and arranging one of the held patterns on a character at random, thereby adding gradation.

In PTL 1 and PTL 2, to add gradation to a character, sensor information such as a pressure value or a voltage value is necessary for each coordinate of the character portion. In addition, a dedicated device configured to acquire the sensor information is needed. In PTL 3, the gradation patterns need to be registered in advance, and it is impossible to add gradation other than the registered patterns.

CITATION LIST

Patent Literature

PTL 1: Japanese Patent Laid-Open No. 2015-56101
PTL 2: Japanese Patent Laid-Open No. 2014-16871
PTL 3: Japanese Patent Laid-Open No. H09-6309

SUMMARY OF THE INVENTION

The present invention provides an information processing system that adds gradation to an input image without using a dedicated device and a predetermined gradation pattern, an information processing apparatus and an image forming apparatus.

The present invention in one aspect provides an information processing system comprising: an image forming device configured to from an image on a sheet; a reading device configured to read an original; a unit configured to acquire, using the reading device, a read image from an original on which a handwritten character is written; a unit configured to acquire, based on the read image, a partial image that is a partial region of the read image and a binarized image that expresses the partial image by two tones; a unit configured to perform learning of a learning model based on learning data that uses the partial image as a correct answer image and the binarized image as an input image; a unit configured to acquire print data including a font character; a unit configured to generate conversion image data including a gradation character obtained by inputting the font character to the learning model; and a unit configured to cause the image forming device to form an image based on the generated conversion image data.

Further features of the present invention will become apparent from the following description of exemplary embodiments with reference to the attached drawings. Note that the same reference numerals denote the same or like components throughout the accompanying drawings.

BRIEF DESCRIPTION OF DRAWINGS

The accompanying drawings, which are incorporated in and constitute a part of the specification, illustrate embodiments of the invention and, together with the description, serve to explain principles of the invention.

FIG. 6 is a flowchart showing learning data generation processing;
FIG. 8A is a view showing a database of a learning data set;
FIG. 8B is a view showing a database of a learning data set.

DESCRIPTION OF EMBODIMENTS

Figure 1:
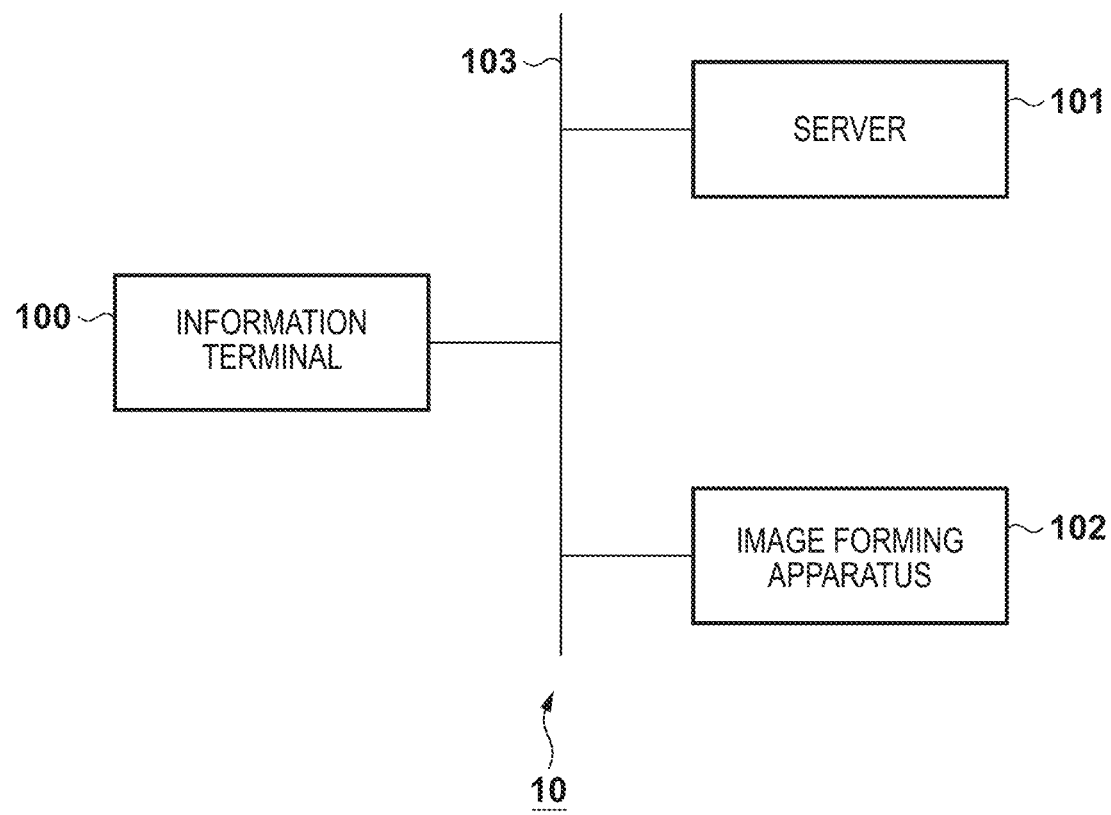
FIG. 1 is a view showing the configuration of an entire image forming system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same constituent elements and a description thereof will be omitted.

First Embodiment

FIG. 1 is a view showing the configuration of an entire image forming system according to this embodiment. An image forming system 10 is configured to include an information terminal 100 (information processing apparatus), a server 101, and an image forming apparatus 102, and these are connected via a network 103 to be communicable with each other. The network 103 may be a wired medium, a wireless medium, or a network in which these coexist. Note that a plurality of information terminals 100 or image forming apparatuses 102 may exit on the network 103. A plurality of servers 101 may be formed on the network 103, and each server may provide a service corresponding to it. Alternatively, one service may be provided by a plurality of apparatuses. The information terminal 100 is, for example, a general-purpose PC or portable terminal and, for example, executes a print instruction to the image forming apparatus 102 via the network 103. For example, upon receiving the print instruction from the information terminal 100, the image forming apparatus 102 acquires print target image data from the server 101 and executes printing. Also, the image forming apparatus 102 may be formed as an MFP (Multifunctional Printer) having the function of a scanner and the like in addition to a printer. In FIG. 1, the server 101 is shown as an apparatus different from the image forming apparatus 102. However, the image forming apparatus 102 may include the server 101 as an internal server.

Figure 2:
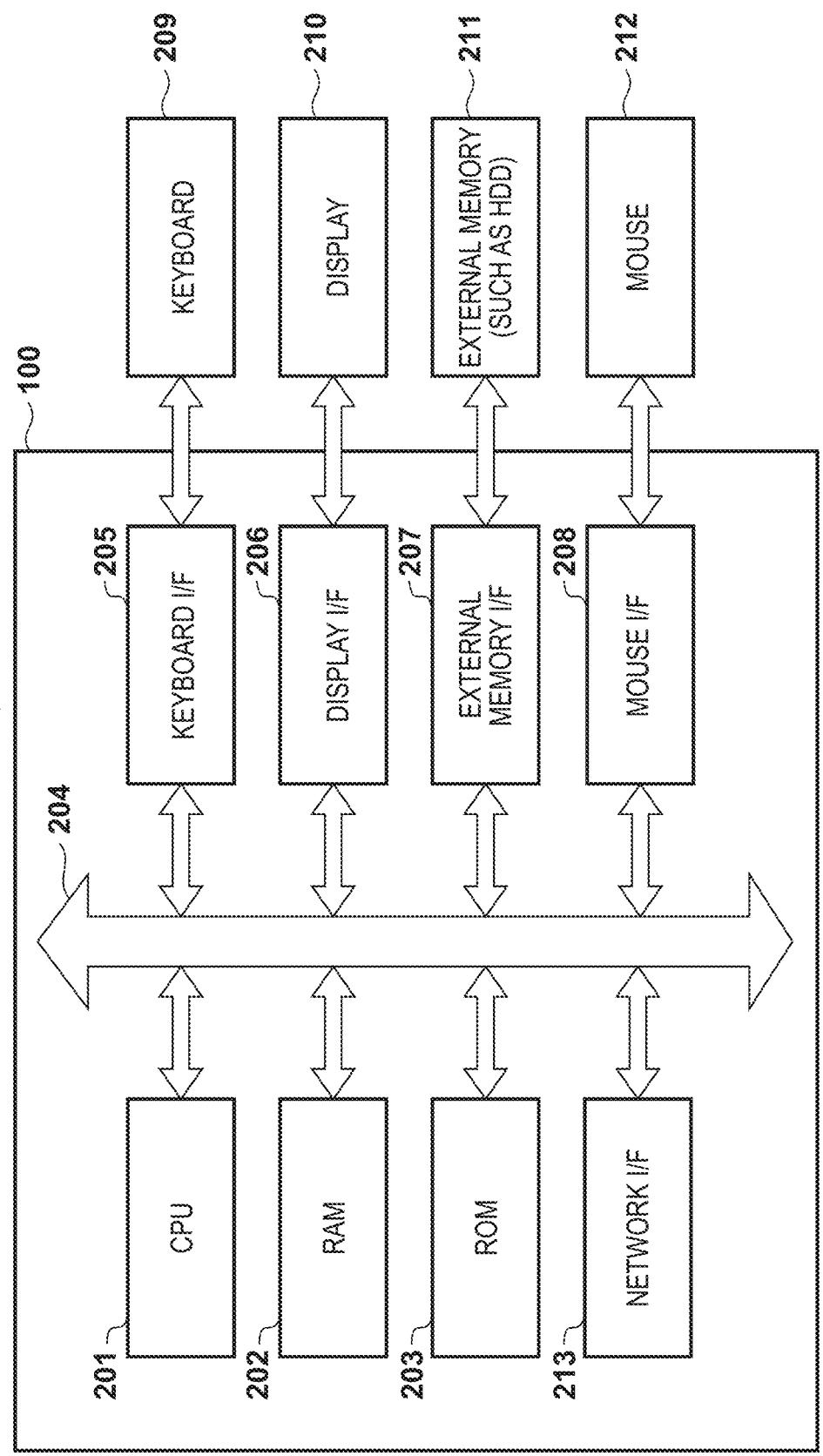
FIG. 2 is a view showing the internal configuration of an information terminal.

FIG. 2 is a view showing the internal configuration of the information terminal 100. The information terminal 100 includes a CPU 201, a RAM 202, a ROM 203, a keyboard interface (I/F) 205, a display I/F 206, an external memory I/F 207, a mouse I/F 208, and a network I/F 213. These are connected via a system bus 204 to be communicable with each other.

A keyboard 209 is connected to the keyboard I/F 205, and a mouse 212 is connected to the mouse I/F 208 to accept instructions and setting operations from a user. A display 210 is connected to the display I/F 206 to display various kinds of user interface screens to the user. An external memory 211 such as an HDD is connected to the external memory I/F 207.

The CPU 201 loads a program stored in the ROM 203 or the external memory 211 such as an HDD into the RAM 202 and executes it, thereby generally controlling the entire information terminal 100. For example, the CPU 201 executes a computer program stored in a computer-readable storage medium and executes processing of a flowchart to be described later, thereby implementing an operation according to this embodiment. The ROM 203 stores various kinds of data including a program configured to activate the CPU 201. The RAM 202 is used as, for example, the work memory of the CPU 201.

Figure 3:
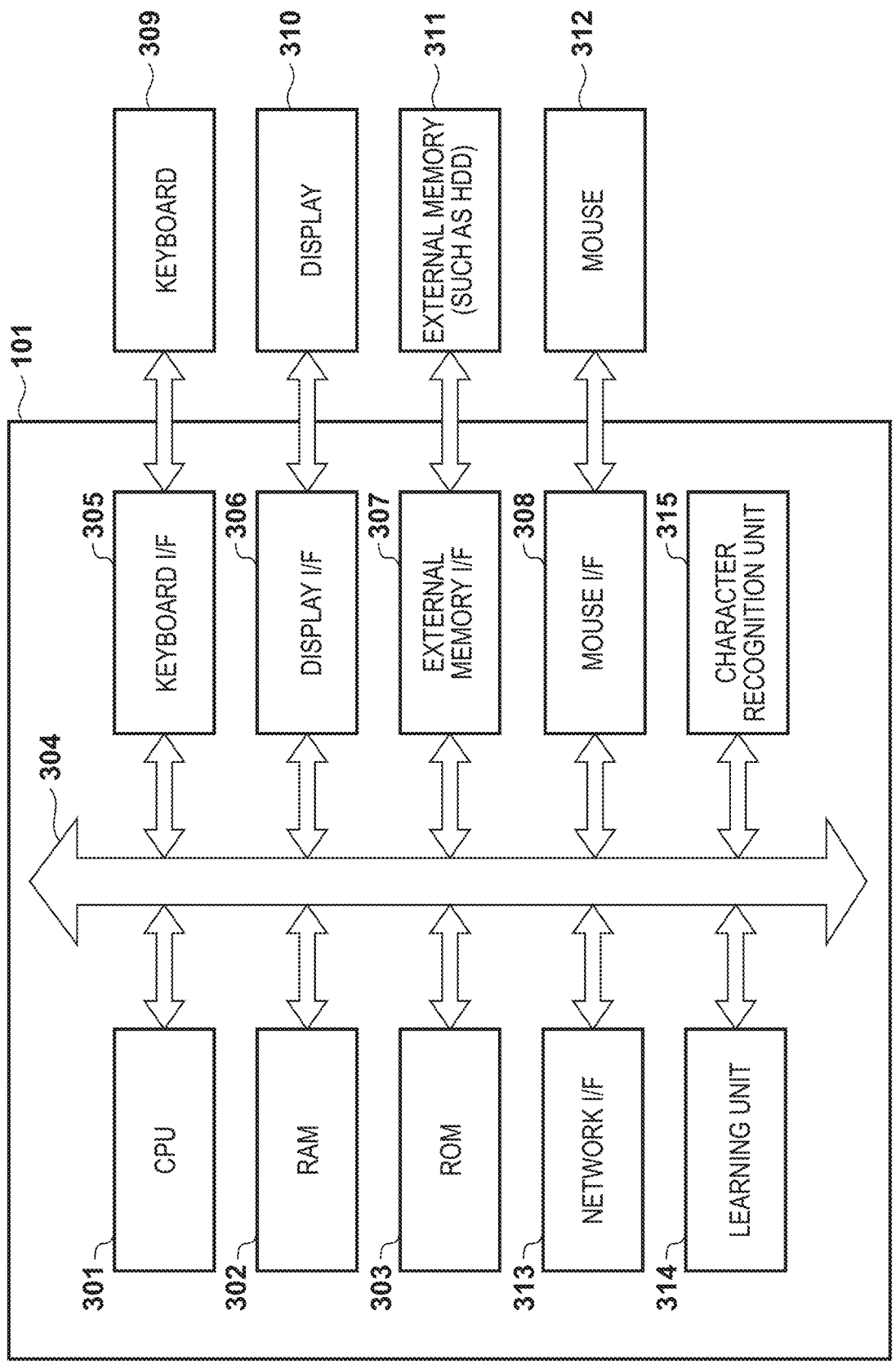
FIG. 3 is a view showing the internal configuration of a server.

FIG. 3 is a view showing the internal configuration of the server 101. The server 101 includes a CPU 301, a RAM 302, a ROM 303, a keyboard I/F 305, a display I/F 306, an external memory I/F 307, a mouse I/F 308, a network I/F 313, a learning unit 314, and a character recognition unit 315. These are connected via a system bus 304 to be communicable with each other. A keyboard 309 is connected to the keyboard I/F 305, and a mouse 312 is connected to the mouse I/F 308 to accept instructions and setting operations from a user. A display 310 is connected to the display I/F 306 to display various kinds of user interface screens to the user. An external memory 311 such as an HDD is connected to the external memory I/F 307.

The CPU 301 loads a program stored in the ROM 303 or the external memory 311 such as an HDD into the RAM 302 and executes it, thereby generally controlling the entire server 101. For example, the CPU 301 executes a computer program stored in a computer-readable storage medium, thereby implementing an operation according to this embodiment. The ROM 303 stores various kinds of data including a program configured to activate the CPU 301. The RAM 302 is used as, for example, the work memory of the CPU 301.

The learning unit 314 includes a GPU that executes machine learning. The learning unit 314, for example, learns a feature amount by similarity analysis or regression analysis using big data stored in a big database. Note that the big database may be, for example, formed as the external memory 311 or may be formed in another server. The big database is constructed by, for example, collecting data (for example, history data of each user) from each device connected to the network 103. In the printing system 10, the learning unit 314, for example, performs learning using a neural network using monochrome image data and color image data as a learning data set, thereby generating a learned model capable of converting a monochrome image into a color image. As a result, it is possible to construct a system capable of obtaining colored image data by inputting arbitrary monochrome image data to the learned model. The character recognition unit 315 recognizes a character by, for example, detecting a spectrum distribution from input image data.

Figure 4:
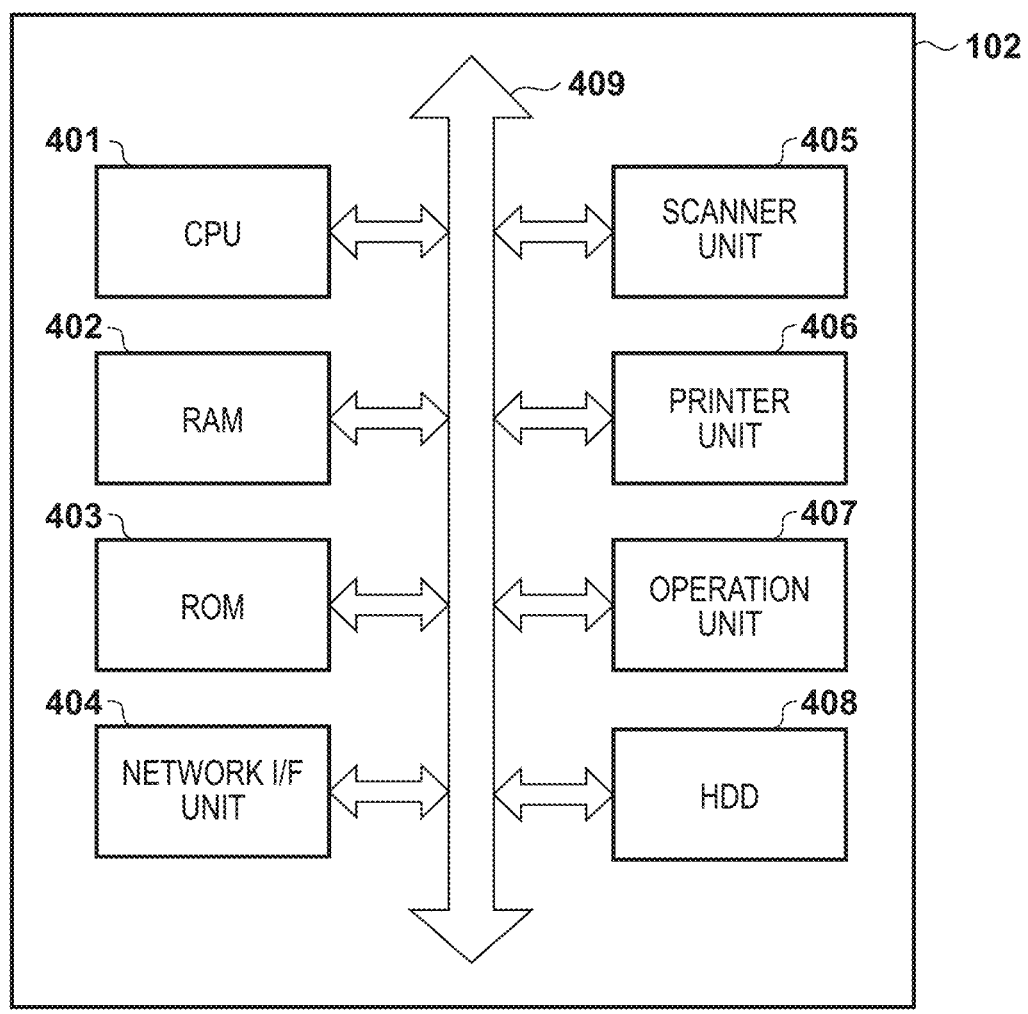
FIG. 4 is a view showing the internal configuration of an image forming apparatus.

FIG. 4 is a view showing the internal configuration of the image forming apparatus 102. The image forming apparatus 102 includes a CPU 401, a RAM 402, a ROM 403, a network I/F unit 404, a scanner unit 405, a printer unit (print unit) 406, an operation unit 407, and an HDD 408. These are connected via a system bus 409 to be communicable with each other. The CPU 401 loads a program stored in the ROM 403 or the HDD 408 into the RAM 402 and executes it, thereby generally controlling the entire image forming apparatus 102. The ROM 403 stores various kinds of data and programs configured to control the image forming apparatus 102. The RAM 402 is, for example, a work memory used by the CPU 401 to operate, and temporarily stores image data.

The scanner unit 405 optically reads an original placed on an ADF (Automatic Document Feeder) or an original table (not shown), thereby generating scan image data. The printer unit 406 prints an image on a print medium such as paper sheet by an inkjet printing method, an electrophotographic method, or the like based on print target image data. The operation unit 407 includes a display unit such as a touch panel, a switch configured to accept a user operation, an LED display device, and the like.

The information terminal 100, the server 101, and the image forming apparatus 102 are not limited to the configurations shown in FIGS. 2, 3, and 4, and blocks may be appropriately formed in accordance with functions executable by the apparatuses. For example, a microphone may be formed such that a voice instruction can be accepted, or a speaker may be formed such that a voice output can be performed. In this case, a block configured to convert an accepted voice signal into voice data is formed. In addition, a voice recognition unit capable of analyzing an accepted voice instruction may be formed. If the image forming apparatus 102 includes the server 101 as an internal server, the image forming apparatus 102 includes the configuration shown in FIG. 3 in addition to the configuration shown in FIG. 4. In such a configuration, an operation of the server 101 to be described below is executed in the image forming apparatus 102.

Figure 5:
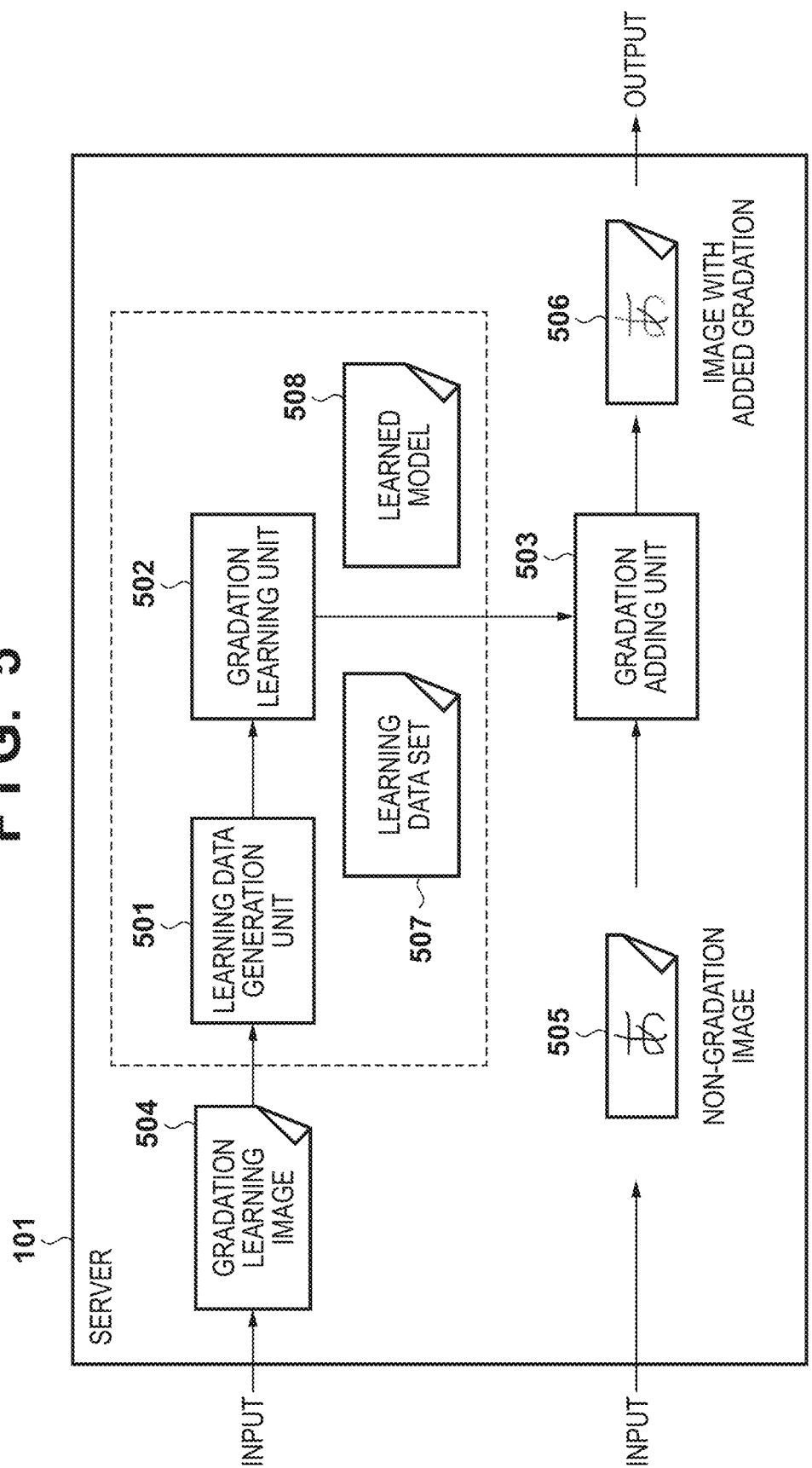
FIG. 5 is a view showing the block configuration of processing of adding gradation to a character in the server.

FIG. 5 is a view showing the block configuration of processing of adding gradation to a character in the server 101. The block configuration shown in FIG. 5 is formed in, for example, the learning unit 314 of the server 101. In this embodiment, processing executed by the server 101 is roughly divided into two processes, that is, processing of learning gradation of an image based on input image data, and processing of adding gradation to image data. The processing of learning gradation is executed by a learning data generation unit 501 and a gradation learning unit 502, and the processing of adding gradation is executed by a gradation adding unit 503. The server 101 inputs gradation image data representing a gradation image like a character written using a fountain pen or the like, and learns gradation. Also, the server 101 inputs non-gradation image data such as a general handwriting-like font (with a handwriting-like shape), and adds gradation to the image data. In this embodiment, by the processing of adding gradation, image data with an added gradation is output from non-gradation image data. With this configuration, gradation is added based on an input handwriting-like font, thereby outputting a handwriting-like font with a stronger handwriting feeling.

In the processing of learning gradation, the server 101 inputs gradation learning image data 504. The gradation learning image data 504 is, for example, image data transmitted from an application operating on the information terminal 100 or image data scanned by the scanner unit 405 of the image forming apparatus 102. For example, as the gradation learning image data 504, image data obtained by reading a gradation image like a character written using a fountain pen or the like by the scanner is input.

The learning data generation unit 501 generates a learning data set 507. The learning data set 507 is a data set of the gradation learning image data 504 and binarized image data obtained by binarizing the gradation learning image data 504. The gradation learning unit 502 learns the gradation of the character using the generated learning data set 507. The gradation learning unit 502 performs learning using a neural network using a data set of the gradation learning image data 504 and the binarized image data as the learning data set 507, thereby generating a learned model 508 capable of converting a non-gradation image into an image with an added gradation.

In the processing of adding gradation, the server 101 inputs non-gradation image data 505. The non-gradation image data 505 is, for example, image data transmitted from an application operating on the information terminal 100 or image data scanned by the scanner unit 405 of the image forming apparatus 102. For example, as the non-gradation image data 505, image data based on a handwriting-like font is input. A character represented by the image data is different from the above-described gradation learning image data 504 in that the shape is handwriting-like, but gradation is absent.

The gradation adding unit 503 acquires the learned model 508 for which learning is performed by the above-described gradation learning unit 502, and inputs the non-gradation image data 505 to the learned model 508, thereby outputting image data 506 with an added gradation. At this time, as the output, for example, the image data 506 with the added gradation may be transmitted to the information terminal 100, and the display 310 of the information terminal 100 may be caused to do display output. Alternatively, the image data 506 with the added gradation may be transmitted to the image forming apparatus 102, and the printer unit 406 of the image forming apparatus 102 may be caused to do print output.

FIG. 6 is a flowchart showing processing of the learning data generation unit 501 of the server 101. Each process shown in FIG. 6 is implemented by, for example, storing a program in any one of the ROM 303, the RAM 302, and the external memory 311 of the server 101 and executing the program by the CPU 301.

In step S600, the learning data generation unit 501 inputs the gradation learning image data 504 transmitted from the information terminal 100, the image forming apparatus 102, or the like. FIGS. 7A to 7D are views showing examples of the gradation learning image data 504. The gradation learning image data 504 is image data representing an image in which only one handwritten character is included in the image, as shown by an image 700 or an image 701 in FIG. 7A. However, the gradation learning image data 504 may be an image in which a plurality of characters are included in the image, for example, data obtained by scanning characters on a whiteboard, as shown by an image 702 in FIG. 7B.

In step S601, the learning data generation unit 501 extracts the region of each character by performing edge detection, contour detection, or the like for the gradation learning image data 504. For example, in the case of the image 702 shown in FIG. 7B, character regions are detected as shown by an image 703 in FIG. 7C, and character image data corresponding to each extracted character region is generated.

In step S602, the learning data generation unit 501 generates binarized image data by expressing (binarizing), by two tones, each pixel value of the character image data generated in step S601. The binarized image data is generated by, for example, comparing the pixel value of each pixel with a predetermined threshold.

Figure 7A:
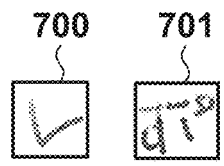
FIG. 7A is a view showing gradation learning image data.

In step S603, the learning data generation unit 501 stores the set of the gradation learning image data 504 input in step S600 and the binarized image data generated in step S602 as the learning data set 507 in the external memory 311 or the like and, after that, ends the processing shown in FIG. 6. The learning data set 507 is training data in so-called supervised learning. Note that in an image in which a plurality of characters are included in the image, the learning data generation unit 501 uses the set of the character image data generated in step S601 and the binarized image data generated in step S602 as the learning data set 507. Also, even if the gradation learning image data 504 is image data of an image as shown in FIG. 7A, the set of the character image data generated in step S601 and the binarized image data generated in step S602 may be used as the learning data set 507.

FIG. 8A is a view showing an example of a database 800 constructed by the learning data set 507. The database 800 is constructed in, for example, the external memory 311. An ID 801 is a field added every time the learning data set 507 is added to the database 800 and used to uniquely identify the learning data set 507. The ID 801 not only identifies each learning data set 507 but also includes a character recognition result by the character recognition unit 315, for example, information representing "い". Binarized image data 802 is a field that holds the binarized image data generated in step S602. Correct answer image data 803 is a field that holds the gradation learning image data 504 received in step S600 or the character image data generated in step S601.

As shown in FIG. 8A, the learning data generation unit 501 stores the gradation learning image data 504 received in step S600 or the character image data generated in step S601 in the correct answer image data 803. The learning data generation unit 501 then stores the binarized image data generated in step S602 in the binarized image data 802, and adds the unique ID 801. The processing shown in FIG. 6 is preprocessing for executing learning processing in FIG. 9 to be described later.

Figure 9:
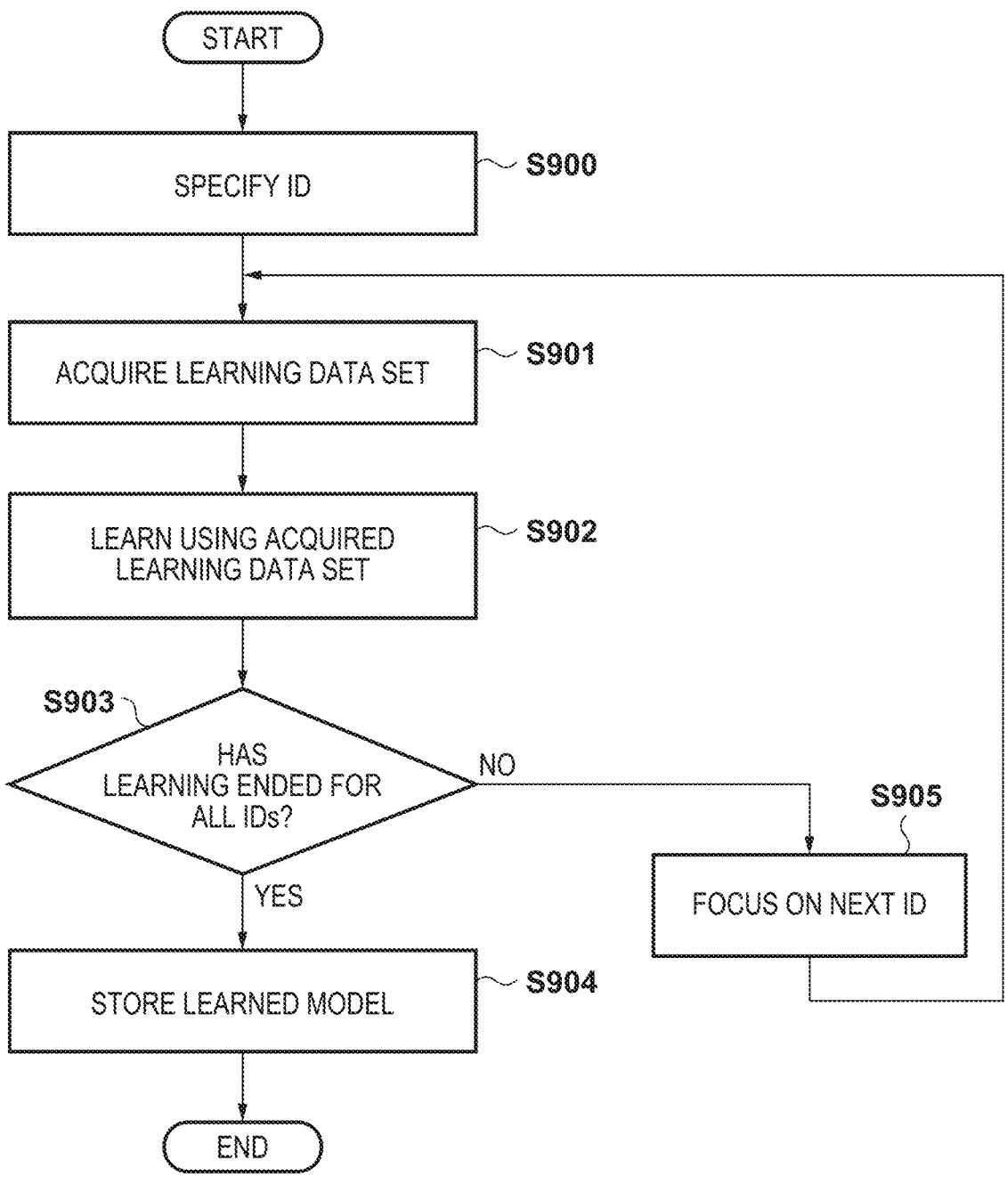
FIG. 9 is a flowchart showing gradation learning processing.

FIG. 9 is a flowchart showing processing of the gradation learning unit 502. Each process shown in FIG. 9 is implemented by, for example, storing a program in any one of the ROM 303, the RAM 302, and the external memory 311 of the server 101 and reading out and executing the program by the CPU 301.

In step S900, the gradation learning unit 502 specifies the ID 801 as a learning target in the database 800. The gradation learning unit 502 may specify, for example, the ID at the start of the database 800. In step S901, the gradation learning unit 502 acquires the learning data set 507 of the binarized image data 802 and the correct answer image data 803 stored in the database 800 in step S603. For example, in the database 800 shown in FIG. 8A, the gradation learning unit 502 first acquires the learning data set 507 of the binarized image data 802 and the correct answer image data 803 corresponding to ID 1.

In step S902, the gradation learning unit 502 learns a gradation tendency for the character shape using the acquired learning data set 507. For example, the gradation learning unit 502 inputs the binarized image data 802 (for example, a non-gradation character "い") to a neural network, and generates, by deep learning, a model that obtains the correct answer image data 803 as the output result.

An example of a gradation tendency learned in step S902 will be described with reference to FIGS. 13A to 13C. For example, in learning of step S902, first, an approximate feature (higher-order feature amount) of the input non-gradation character "い" is extracted, and the tendency of the gradation of a character "い" with gradation is learned in association with the feature amount.

Figure 13A:
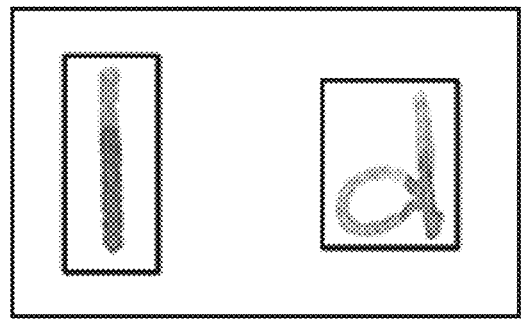
FIG. 13A is a view showing a part of the shape of a correct answer image.
Figure 13B:
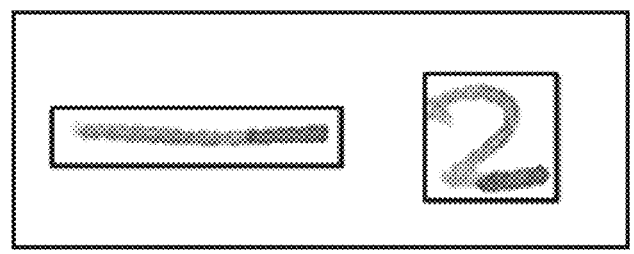
FIG. 13B is a view showing a part of the shape of a correct answer image.
Figure 13C:
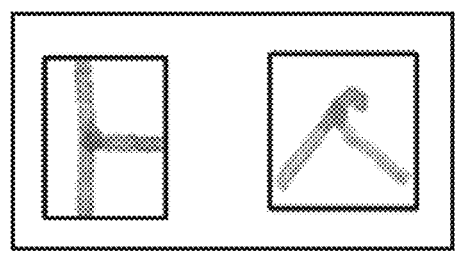
FIG. 13C is a view showing a part of the shape of a correct answer image.

FIGS. 13A to 13C are views showing a part of the shape of a correct answer image represented by the correct answer image data 803 included in the database 800 shown in FIG. 8A. For example, as shown in FIG. 13A, concerning a vertical line portion of a character, a gradation tendency that the portion becomes dark toward the lower side is learned. In addition, as shown in FIG. 13B, concerning a horizontal line portion of a character, a gradation tendency that the portion becomes dark toward the right side is learned. Also, as shown in FIG. 13C, concerning the intersection portion of lines of a character, a gradation tendency that the portion is darker than the other portions is learned. As described above, the gradation learning unit 502 extracts the higher-order feature amount of a character shape and learns a gradation tendency for the shape by deep learning. According to this embodiment, with the configuration for learning the gradation tendency, a pen dedicated to handwriting input need not be prepared, and a gradation pattern need not be generated and registered.

In step S903, the gradation learning unit 502 determines whether the learning of step S902 has been executed for all IDs as the learning target in the database 800. Upon determining that the learning of step S902 has been executed for all IDs as the learning target, the process advances to step S904. In step S904, the gradation learning unit 502 stores the learned model 508 of each character in the external memory 311 and, after that, ends the processing shown in FIG. 9. On the other hand, upon determining in step S903 that the learning of step S902 has not been executed for all IDs as the learning target, in step S905, the gradation learning unit 502 specifies the next ID and repeats the processing from step S901.

The ID 801 in FIG. 8A is identification information capable of identifying the learning data set 507 of the same character. The processing shown in FIG. 9 is started when the learning data sets 507 in a predetermined number or more are accumulated in the database 800 for the same character, for example, when 100 or more learning data sets 507 are accumulated for the character "い". For example, although FIG. 8A shows only one learning data set 507 for the character "い" for the descriptive convenience, a plurality of learning data sets 507 (for example, a plurality of learning data sets provided from a plurality of users) are stored for the character "い" in the database 800. By repeating the processes of steps S901 to S903 and S905, in step S902, gradation tendencies as shown in FIGS. 13A to 13C are learned using a plurality of learning data sets 507 for the character "い" and as a result, the learned model 508 is generated for the character "い". In step S905 of FIG. 9, in the learning data sets 507 for the same character, the ID of the learning data set 507 for which the learning in step S902 has not been executed yet is specified. When the processing shown in FIG. 9 has ended for the character "い", in the group of the learning data sets 507 for another character, for example, a character "球", the ID of one learning data set 507 is specified in step S900, and the processing from step S901 is performed, thereby generating the learned model 508 for the character "球".

In addition, the ID may also be associated with user information. In the processing shown in FIG. 9, an ID may be specified such that a plurality of different pieces of user information coexist for the group of the learning data sets 507 of the same character. For example, if the total number of learning data sets 507 is 1,000, and the number of users of the image forming system 10 is 100, the ID of the learning data set 507 as the learning target may be specified while giving priority to evenly including different users rather than increasing the IDs of the learning data sets 507 as the learning target. This is because the gradation learning image data 504 is, for example, original image data obtained by reading, using the scanner unit 405, a character hand-written by a user, and the habits of the user are reflected on the data. That is, even if a number of learning data sets 507 as the learning target are acquired, if the user is the same, the habits of the user are strongly learned, and the learning cannot appropriately be performed. Hence, when the ID as the target of the processing shown in FIG. 9 is specified such that the users are evenly included, overlearning as described above can be prevented, and the generalization capability of the learned model 508 can be improved. On the other hand, the ID of the learning data set 507 corresponding to a designated user may be included. If the user who uses the image forming system 10 is limited, the ratio of learning for the habits of the user is increased, thereby generating the learned model 508 more adaptive to the specific user. Also, generation of the learned models 508 of the above-described two types may selectively be executed.

Figure 10:
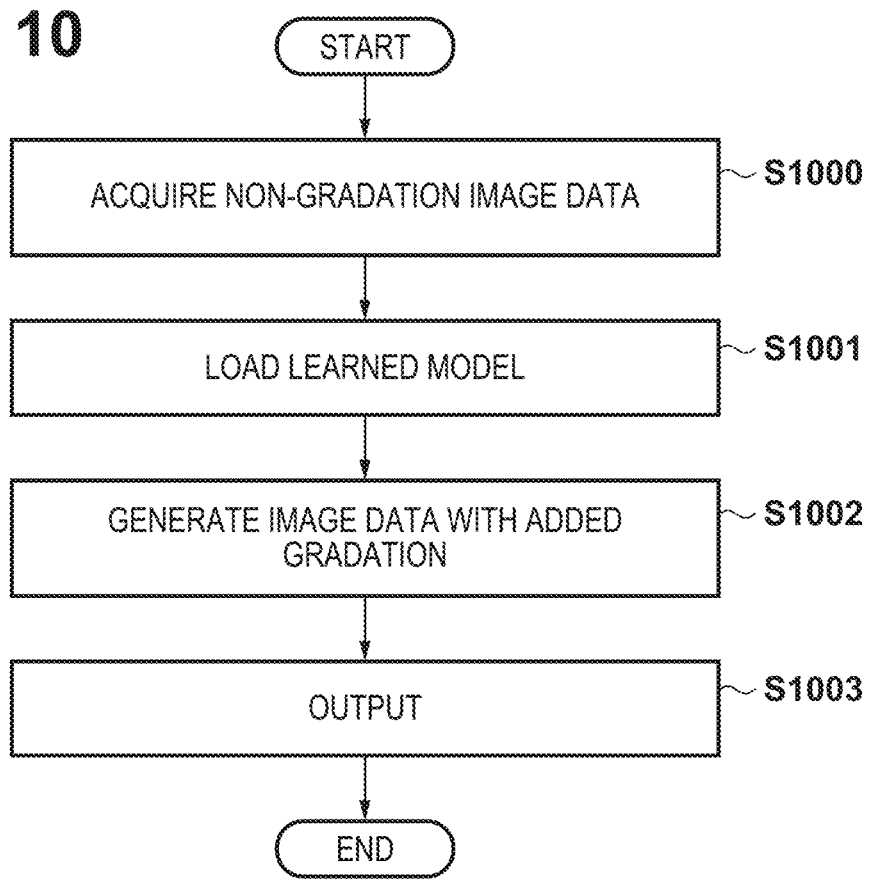
FIG. 10 is a flowchart showing gradation addition processing.

FIG. 10 is a flowchart showing processing of the gradation adding unit 503. Each process shown in FIG. 10 is implemented by, for example, storing a program in any one of the ROM 303, the RAM 302, and the external memory 311 of the server 101 and reading out and executing the program by the CPU 301.

In step S1000, the gradation adding unit 503 inputs image data transmitted from the information terminal 100 or the image forming apparatus 102. Here, the image data transmitted from the information terminal 100 or the image forming apparatus 102 is, for example, original image data optically read by the scanner unit 405 or text data created by an application. The gradation adding unit 503 performs character recognition for the input image data, and extracts each recognized character, thereby acquiring the non-gradation image data 505.

In step S1001, based on the result of character recognition, the gradation adding unit 503 loads, from the external memory 311, the corresponding learned model 508 stored in step S903. For example, if the character represented by the non-gradation image data 505 is "レ", the learned model 508 corresponding to "レ" is loaded from the external memory 311.

In step S1002, the gradation adding unit 503 inputs the non-gradation image data 505 acquired in step S1000 to the learned model 508, thereby generating the image data 506 with an added gradation. In the learned model 508, an approximate feature of the shape of the character represented by the non-gradation image data 505 is extracted as a higher-order feature amount. Based on the extracted feature amount, the gradation distribution in the character is decided in accordance with the learned gradation tendency. In step S1003, the gradation adding unit 503 outputs the image data 506 with the added gradation. As described above, this output may be display output by the display 310 of the information terminal 100 or print output by the printer unit 406 of the image forming apparatus 102.

Figure 11:
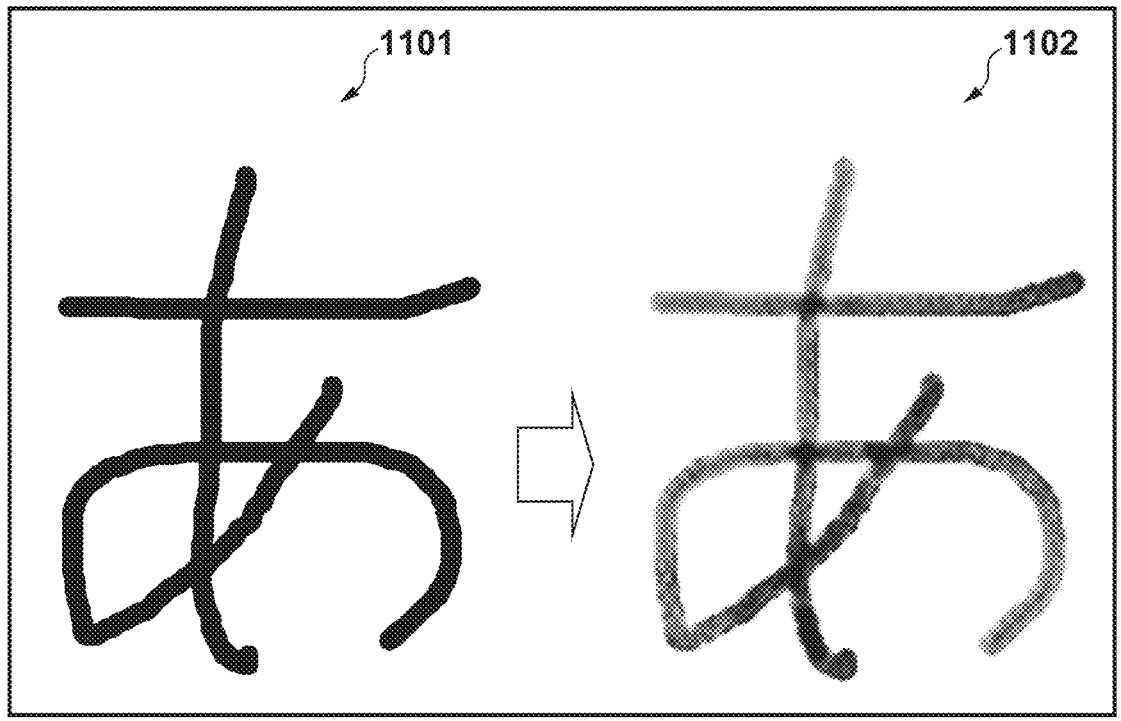
FIG. 11 is a view an image to which gradations are added by the processing shown in FIG. 10.

FIG. 11 is a view an example of an image represented by the image data 506 to which gradation is added by the processing shown in FIG. 10. For example, when image data 1101 representing a binary image is input to the learned model 508, the learned model 508 corresponding to a character "あ", image data 1102 with an added gradation is output. As shown in FIG. 11, gradation is added to a vertical line portion of the character "あ" such that the portion becomes dark toward the lower side. In addition, gradation is added to a horizontal line portion of the character "あ" such that the portion becomes dark toward the right side. Also, gradation is added to an intersection portion of lines of the character "あ" such that the portion becomes darker than the other portions. In this way, the image data on which the gradation tendencies as described with reference to FIGS. 13A to 13C are reflected is output.

In this embodiment, the configuration for generating the learned model 508 for each character has been described. However, another configuration may be used for generation of the learned model 508. For example, focusing a specific shape portion of a character, the learned model 508 corresponding to the shape portion may be generated. The specific shape portion is, for example, a vertical line portion, a horizontal line portion, a sweeping portion, or a stop portion of a character. In such a configuration, when the gradation learning image data 504 is input in step S600 of FIG. 6, in step S601, the image data of each specific shape portion is generated instead of generating character image data. Each specific shape portion may be specified and extracted based on a spectrum result of scanning a character. In step S602, binarized image data is generated for the image data of the specific shape portion, and in step S603, the image data of the specific shape portion and the binarized image data are stored as the learning data set 507 in the external memory 311 or the like. The processing shown in FIG. 9 is the same as that described above. The processing shown in FIG. 10 may be performed as follows. In step S1000, the gradation adding unit 503 further detects a specific shape portion from the non-gradation image data 505 by the same method as in step S601 described above. In step S1001, the gradation adding unit 503 loads, from the external memory 311, the corresponding learned model 508 corresponding to the detection result of the specific shape portion and stored in step S904. In step S1002, the gradation adding unit 503 inputs the specific shape portion of the non-gradation image data 505, which is detected in step S1000, to the learned model 508, thereby outputting the image data 506 with added gradation for the specific shape portion. The image data 506 with the added gradation (for example, a horizontal line portion), which is output for each specific shape portion, is superimposed on the non-gradation image data 505 (for example, the character thereby outputting the image data 506 with added gradation.

As described above, when a learning configuration corresponding to a specific shape portion is formed, for example, gradation can be added regardless of a character type such as hiragana, Chinese character, katakana, or alphabet.

As described above, according to this embodiment, binarized image data is generated from image data including a handwritten character, a learning data set of image data with gradation and non-gradation image data is generated, and gradation is learned for each character or specific shape, thereby generating a learned model. With this configuration, without using a dedicated device and a predetermined gradation pattern, it is possible to add gradation to an input image and add gradation as in handwriting to a non-gradation character.

Second Embodiment

In the first embodiment, as described with reference to FIG. 6, the learning data set 507 is generated on a character basis in gradation learning. In this embodiment, an image obtained by extracting a rectangular region of a predetermined size from a whole image is used in place of data generated on a character basis. Concerning the second embodiment, points different from the first embodiment will be described below.

Figure 12:
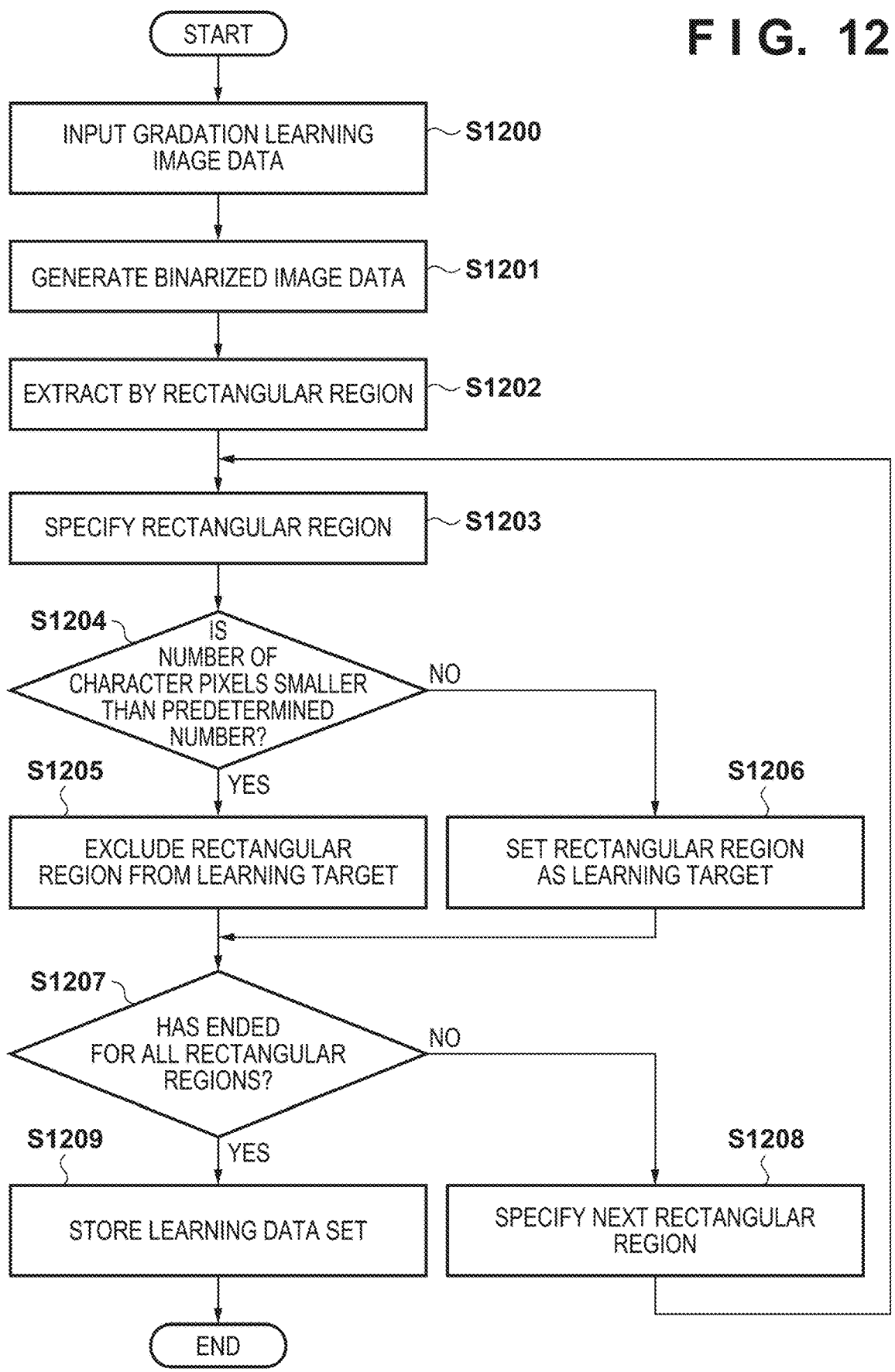
FIG. 12 is a flowchart showing learning data generation processing.

FIG. 12 is a flowchart showing processing of a learning data generation unit 501 according to this embodiment. Each process shown in FIG. 12 is implemented by storing a program in any one of a ROM 303, a RAM 302, and an external memory 312 of a server 101 and executing the program by a CPU 301.

In step S1200, the learning data generation unit 501 inputs gradation learning image data 504 transmitted from an information terminal 100, an image forming apparatus 102, or the like.

In step S1201, the learning data generation unit 501 generates binarized image data by expressing (binarizing), by two tones, each pixel value of the gradation learning image data 504 input in step S1200. The binarized image data is generated by, for example, comparing the pixel value of each pixel with a predetermined threshold.

Figure 7B:
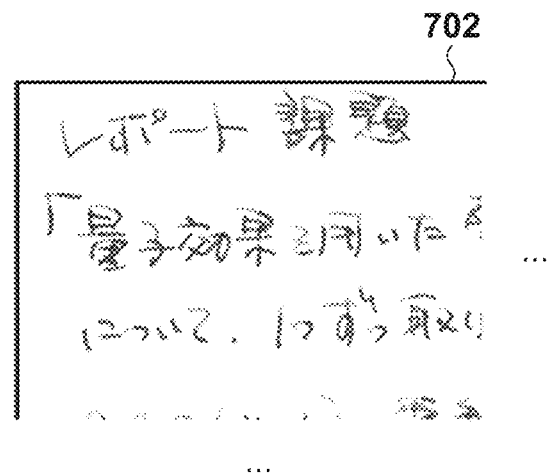
FIG. 7B is a view showing gradation learning image data.
Figure 7C:
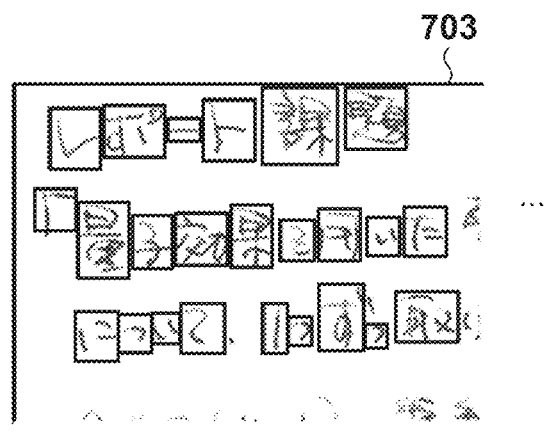
FIG. 7C is a view showing gradation learning image data.
Figure 7D:
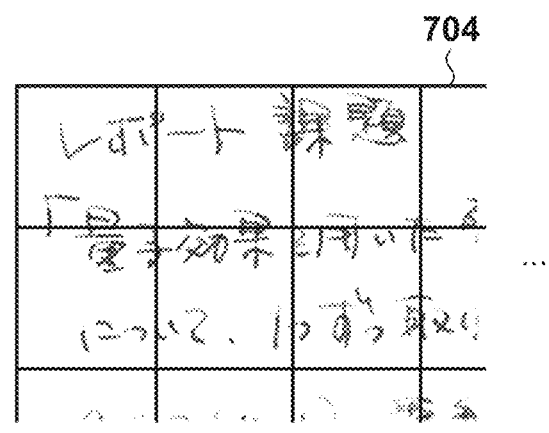
FIG. 7D is a view showing gradation learning image data.

In step S1202, the learning data generation unit 501 extracts a rectangular region of a predetermined size from each of the gradation learning image data 504 input in step S1200 and the binarized image data generated in step S1201. For example, in gradation learning image data 702 as shown in FIG. 7B, each of regions divided by rectangular regions is extracted, as shown by gradation learning image data 704 in FIG. 7D. Here, for the gradation learning image data 702 and the binarized image data, the same rectangular regions are extracted. The size of the rectangular region need only be a size including a plurality of characters.

In step S1203, the learning data generation unit 501 specifies one of the rectangular regions extracted in step S1202. Here, any one of the rectangular regions of the gradation learning image data 504 and the rectangular regions of the binarized image data may be specified.

In step S1204, the learning data generation unit 501 determines whether the number of character pixels in the specified rectangular region is smaller than a predetermined number. Upon determining that the number of character pixels is smaller than the predetermined number, it is judged that the extracted image data includes little gradation information and is not suitable for learning. In step S1205, the rectangular region is excluded from the learning target, and the process advances to step S1207. On the other hand, upon determining that the number of character pixels is not smaller than the predetermined number, in step S1206, the rectangular region is set to the learning target, and the process advances to step S1207.

In step S1207, the learning data generation unit 501 determines whether the processing in steps S1203 to S1206 has ended for all rectangular regions. Upon determining that the processing has ended for all rectangular regions, the process advances to step S1209. On the other hand, upon determining that the processing has not ended for all rectangular regions, in step S1208, the learning data generation unit 501 specifies the next rectangular region and repeats the processing from step S1203.

In step S1209, the learning data generation unit 501 stores the data set of the gradation learning image data and the binarized image data extracted in step S1202, which is the data set determined as the learning target in step S1206, as a learning data set 507 in an external memory 311. For example, if the learning data set 507 is generated from the gradation learning image data 704 shown in FIG. 7D, a database 810 of the learning data set 507 as shown in FIG. 8B is stored in the external memory 311. After step S1209, the processing shown in FIG. 12 is ended.

Gradation learning after the processing shown in FIG. 12 is the same as that described with reference to FIG. 9. As for gradation addition, in step S1001 of FIG. 10, a learned model 508 including a character corresponding to the character recognition result of non-gradation image data 505 acquired in step S1000 is loaded from the external memory 311. For example, if the character represented by the non-gradation image data 505 is "レ", the learned model 508 of ID 1 in FIG. 8B, which includes "レ", is acquired. Steps S1002 and S1003 are the same as described above.

As described above, according to this embodiment, the learning data set 507 can be generated without performing extraction processing on a character basis as described concerning step S601.

In the first and second embodiments, the processes shown in FIGS. 6, 9, 10, and 12 are executed on the server 101.

However, in both embodiments, these processes may be executed on an apparatus different from the server 101. For example, the processes may be executed on the image forming apparatus 102. In this case, for each of the processes shown in FIGS. 6, 9, 10, and 12, for example, a program is stored in one of the ROM 403, the RAM 402, and the HDD 408 of the image forming apparatus 102. When executing each process, the program is read out from one of the ROM 403, the RAM 402, and the HDD 408 of the image forming apparatus 102 and executed by the CPU 401. At this time, the gradation learning image data 504 and the non-gradation image data 505 are, for example, image data transmitted from the information terminal 100 or image data scanned by the scanner unit 405 of the image forming apparatus 102. The learning data set 507 generated by the processes shown in FIGS. 6 and 12 and the learned model 508 generated in FIG. 9 are stored in the HDD 408 of the image forming apparatus 102. The timing of executing gradation learning can be any timing before the processing of adding gradation. For example, gradation learning may be executed before product shipment of the image forming apparatus 102, and the learned model 508 may be stored in the HDD 408 of the image forming apparatus 102.

Figure 15:
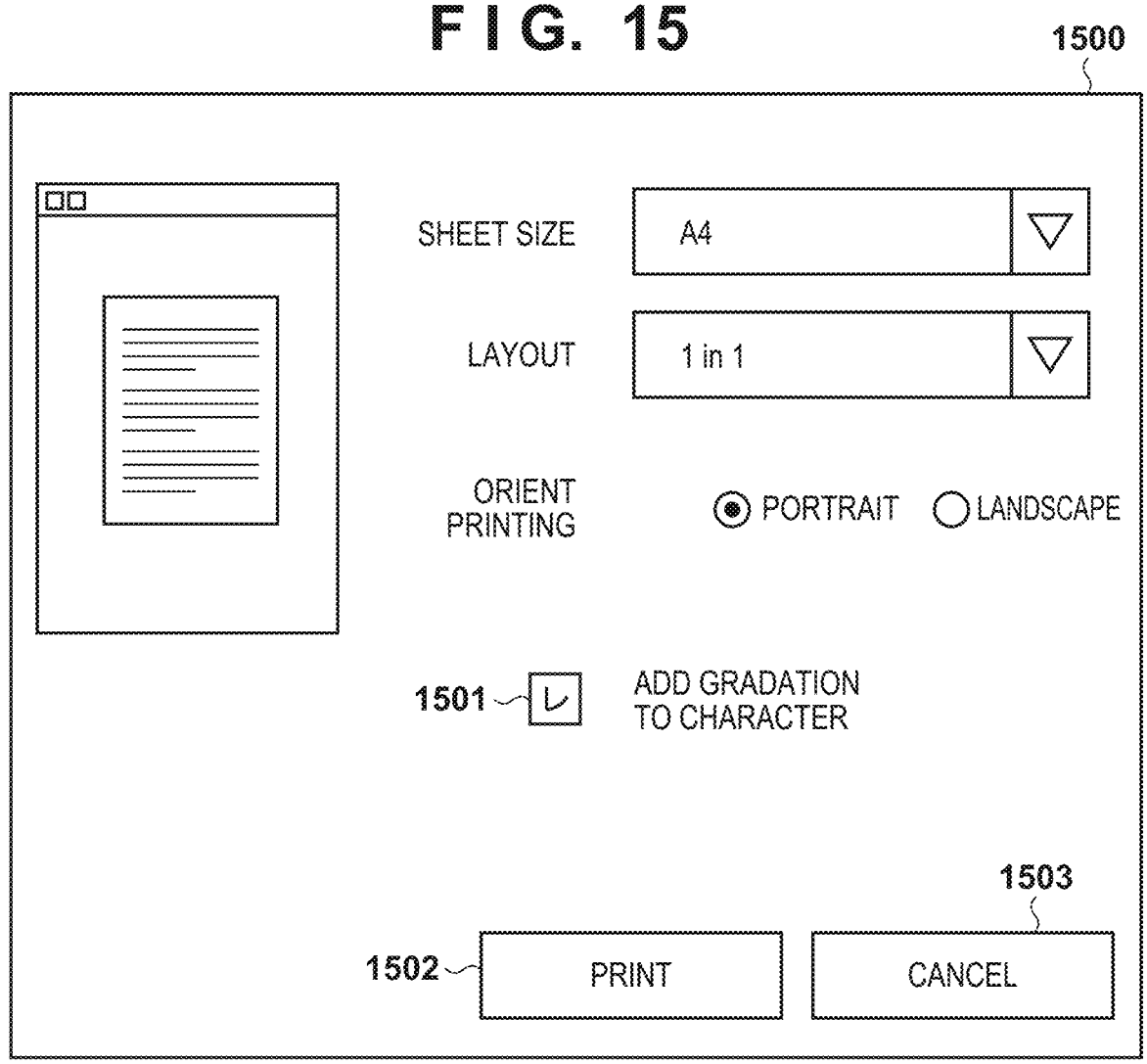
FIG. 15 is a view showing the user interface screen of the information terminal.

FIG. 15 is a view showing an example of a setting screen in printing, which is displayed on the display 210 of the information terminal 100 when a print job is input from the information terminal 100 to the image forming apparatus 102. When the user instructs, on the information terminal 100, to print document data or the like, a print setting screen 1500 is displayed on the display 210.

As shown in FIG. 15, the print setting screen 1500 is provided with a check box 1501 representing whether to add gradation to a character. To add gradation to a character, the user checks the check box 1501. When a cancel button 1503 is pressed, the set contents in the print setting screen 1500 are reset. When a print button 1502 is pressed in a state in which the check box 1501 is checked, the image forming apparatus 102 executes the processes shown in FIGS. 6, 9, 10, and 12 for image data transmitted from the information terminal 100, and the printer unit 406 prints an image with added gradation. By the processing as described above, the user can be caused to select whether to add gradation to a character on print target image data.

A configuration used when transmitting image data scanned by the scanner unit 405 of the image forming apparatus 102 to the server 101 in a case in which the processes shown in FIGS. 6, 9, 10, and 12 are executed on the server 101 in the first and second embodiments will be described.

Figure 14:
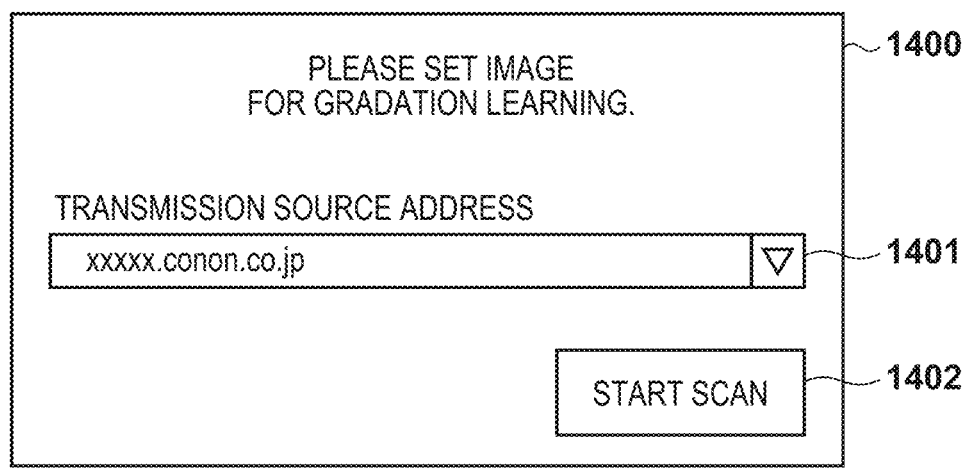
FIG. 14 is a view showing the user interface screen of the image forming apparatus.

FIG. 14 is a view showing an example of a user interface screen configured to acquire the gradation learning image data 504 by the scanner unit 405 of the image forming apparatus 102. The screen shown in FIG. 14 may be displayed from, for example, the main menu of the image forming apparatus 102. A screen 1400 shown in FIG. 14 is a screen used to scan the gradation learning image data 504 by the operation unit 407 of the image forming apparatus 102. A text box 1401 is a region that accepts the designation of a transmission destination address serving as the transmission destination of scanned image data. When the user designates the transmission destination address in the text box, sets an original with handwritten characters on the original table, and presses a scan start button 1402, the image forming apparatus 102 starts scanning by the scanner unit 405, acquires the gradation learning image data 504, and transmits it to the server 101. In the text box 1401, the address of an apparatus (for example, the server 101)

capable of performing the processes shown in FIGS. 6, 9, 10, and 12 is designated, and the user can select it.

According to the present invention, it is possible to add gradation to an input image without using a dedicated device and a predetermined gradation pattern.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing system comprising:
an image forming device configured to form an image on a sheet;
a reading device configured to read an original;
a unit configured to acquire, using the reading device, a read image from an original on which a handwritten character is written;
a unit configured to acquire, based on the read image, a partial image that is a partial region of the read image and a binarized image that expresses the partial image by two tones;
a unit configured to perform learning of a learning model based on learning data that uses the partial image as a correct answer image and the binarized image as an input image;
a unit configured to acquire print data including a font character;
a unit configured to generate conversion image data including a gradation character obtained by inputting the font character to the learning model; and
a unit configured to cause the image forming device to form an image based on the generated conversion image data.

2. The information processing system according to claim 1, further comprising:
a unit configured to detect a character included in the read image; and
a unit configured to generate the partial image based on a result of the detection.

3. The information processing system according to claim 2, wherein a step of performing the detection is one of a step of performing edge extraction and a step of performing contour extraction.

4. The information processing system according to claim 2, wherein the partial image is an image including one character.

5. The information processing system according to claim 2, wherein the partial image is an image including a part of one character.

6. The information processing system according to claim 5, wherein the part of the character is one of a vertical line portion, a horizontal line portion, a stop portion, and a sweeping portion.

7. The information processing system according to claim 1, further comprising:
a unit configured to divide the read image into a plurality of partial regions each having a predetermined size; and
a unit configured to generate the partial image as an image of one region of the plurality of partial regions.

8. The information processing system according to claim 1, further comprising a unit configured to generate the binarized image by binarizing the partial image.

9. The information processing system according to claim 1, further comprising:
a display device configured to display information; and
a unit configured to cause the display device to display a screen for designating a sending destination of the read image.

10. The information processing system according to claim 1, further comprising:
a display device configured to display information; and
a unit configured to cause the display device to display a screen capable of designating whether to perform processing using the learning model in image formation of the print data.

11. The information processing system according to claim 1, wherein the font character is one of a hiragana, a katakana, a Chinese character, and an alphabet.

12. The information processing system according to claim 1, wherein the learning model is a learning model that has learned that a lower portion of a vertical line included in a character becomes dark.

13. The information processing system according to claim 1, wherein the learning model is a learning model that has learned that a right side portion of the vertical line included in the character becomes dark.

14. The information processing system according to claim 1, wherein the learning model is a learning model that has learned that an intersection portion of the vertical line included in the character becomes dark.

15. The information processing system according to claim 1, wherein the learning model is a learning model that has learned gradation for the stop portion included in the character.

16. The information processing system according to claim 1, wherein the learning model is a learning model that has learned gradation for the sweeping portion included in the character.

17. An information processing apparatus comprising:
a unit configured to acquire a read image obtained by reading, by a reading device, an original on which a handwritten character is written;
a unit configured to acquire, based on the read image, a partial image that is a partial region of the read image and a binarized image that expresses the partial image by two tones; and
a unit configured to generate learning data that uses the partial image as a correct answer image and the binarized image as an input image,
wherein the learning data is used for learning of a learning model that outputs a gradation character having gradation in response to input of a font character.

18. An image forming apparatus comprising:
an image forming device configured to form an image on a sheet;
a unit configured to acquire print data including a font character;
a unit configured to acquire image data including a gradation character obtained by inputting the font character to a learning model based on the print data; and
a unit configured to cause the image forming device to form an image based on the acquired image data,
wherein the learning model is a learning model learned using learning data that uses a partial image as a correct answer image and a binarized image as an input image, and
the partial image is an image of a partial region of a read image obtained by reading, by a reading device, an original on which a handwritten character is written, and the binarized image is an image that expresses the partial image by two tones.

* * * * *